(12) United States Patent
Hancock

(10) Patent No.: US 10,066,843 B2
(45) Date of Patent: Sep. 4, 2018

(54) METHODS FOR OPERATING AND CONSTRUCTING A BLOW THROUGH AIR HANDLER

(71) Applicant: Trane International Inc., Piscataway, NJ (US)

(72) Inventor: Stephen S. Hancock, Flint, TX (US)

(73) Assignee: Trane International Inc., Piscataway, NJ (US)

( * ) Notice: Subject to any disclaimer, the term of this patent is extended or adjusted under 35 U.S.C. 154(b) by 215 days.

(21) Appl. No.: 15/052,292

(22) Filed: Feb. 24, 2016

(65) Prior Publication Data

US 2016/0169540 A1    Jun. 16, 2016

Related U.S. Application Data

(62) Division of application No. 12/492,931, filed on Jun. 26, 2009, now Pat. No. 9,303,882.

(51) Int. Cl.

| | |
|---|---|
| *F24H 3/00* | (2006.01) |
| *F24F 3/044* | (2006.01) |
| *F24H 3/02* | (2006.01) |
| *F24H 3/04* | (2006.01) |
| *F24H 3/12* | (2006.01) |
| *B23P 19/00* | (2006.01) |
| *F24H 9/00* | (2006.01) |
| *F28B 1/06* | (2006.01) |

(52) U.S. Cl.
CPC ............ *F24F 3/044* (2013.01); *B23P 19/00* (2013.01); *F24F 3/0442* (2013.01); *F24H 3/02* (2013.01); *F24H 3/022* (2013.01); *F24H 3/0411* (2013.01); *F24H 3/12* (2013.01); *F24H 9/0063* (2013.01); *F28B 1/06* (2013.01); *Y10T 29/4935* (2015.01)

(58) Field of Classification Search
CPC ........... F24F 3/044; F24F 3/0442; F24H 3/02; F24H 3/022; F24H 3/0411; F24H 3/12; F24H 9/0063; B23P 19/00
See application file for complete search history.

(56) References Cited

U.S. PATENT DOCUMENTS

| | | |
|---|---|---|
| 2,740,268 A | 4/1956 | Jones |
| 2,780,445 A | 2/1957 | Rimbach |
| (Continued) | | |

OTHER PUBLICATIONS

Office Action dated Jul. 19, 2012; U.S. Appl. No. 12/492,931, filed Jun. 26, 2009; 6 pages.

(Continued)

*Primary Examiner* — Ljiljana Ciric

(74) *Attorney, Agent, or Firm* — Conley Rose, P.C.; J. Robert Brown, Jr.

(57) ABSTRACT

A method of constructing an air handling unit includes forming an air handling enclosure, mounting a blower in the air handling enclosure, mounting a heat exchanger in the air handling enclosure downstream of the blower, and mounting at least one heating element in the air handing enclosure downstream of the blower. A method of operating an HVAC system includes disposing a heat exchanger downstream of a blower within an enclosure, providing an airflow through the enclosure, and orienting a plurality of fins on the heat exchanger to stabilize the airflow exiting the heat exchanger prior to the airflow contacting an electrically-powered resistive heating element.

20 Claims, 6 Drawing Sheets

(56) References Cited

U.S. PATENT DOCUMENTS

| | | | |
|---|---|---|---|
| 2,995,906 A | 8/1961 | Brandimarte | |
| 3,213,936 A | 10/1965 | Tull | |
| 3,313,342 A | 4/1967 | Laing | |
| 3,372,870 A | 3/1968 | Norris et al. | |
| 3,653,431 A | 4/1972 | Loveley | |
| 3,759,321 A | 9/1973 | Ares | |
| 4,035,610 A | 7/1977 | Roth | |
| 4,337,823 A | 7/1982 | DelPercio | |
| 4,511,786 A * | 4/1985 | Jansen | F24H 3/0411 165/123 |
| 4,523,081 A * | 6/1985 | Geib, Sr. | F24H 3/0411 165/123 |
| 4,644,135 A * | 2/1987 | Daily | F24H 3/0411 392/363 |
| 4,671,076 A | 6/1987 | Duren | |
| 5,062,280 A | 11/1991 | Martin, Sr. | |
| 5,067,560 A | 11/1991 | Carey et al. | |
| 5,228,197 A | 7/1993 | Cox et al. | |
| 5,279,360 A | 1/1994 | Hughes et al. | |
| 5,284,027 A | 2/1994 | Martin, Sr. | |
| 5,341,870 A | 8/1994 | Hughes et al. | |
| 5,613,554 A | 3/1997 | Bull et al. | |
| 5,927,096 A | 7/1999 | Piccione | |
| 5,947,195 A | 9/1999 | Sasaki | |
| 5,987,909 A | 11/1999 | Martin, Sr. | |
| 6,276,443 B1 | 8/2001 | Martin, Sr. | |
| 6,457,653 B1 | 10/2002 | Campbell | |
| 6,519,966 B1 | 2/2003 | Martin, Sr. | |
| 7,185,513 B2 | 3/2007 | Bush et al. | |
| 7,614,248 B2 | 11/2009 | Lee et al. | |
| 7,921,904 B2 | 4/2011 | Matter et al. | |
| 8,769,979 B2 | 7/2014 | Timbs et al. | |
| 8,910,492 B2 | 12/2014 | Ikeda et al. | |
| 9,086,243 B2 | 7/2015 | Komori et al. | |
| 9,086,245 B2 | 7/2015 | Kitazawa et al. | |
| 9,103,599 B2 | 8/2015 | Lee et al. | |
| 9,115,939 B2 | 8/2015 | Huazhao et al. | |
| 9,303,882 B2 | 4/2016 | Hancock | |
| 2009/0038328 A1 | 2/2009 | Piccione | |
| 2010/0218534 A1* | 9/2010 | Yabu | F24F 3/1411 62/271 |
| 2011/0100051 A1 | 5/2011 | Edens et al. | |
| 2015/0114600 A1 | 4/2015 | Chen et al. | |
| 2015/0211782 A1 | 7/2015 | Ikeda et al. | |
| 2015/0267931 A1 | 9/2015 | Ai et al. | |
| 2015/0285523 A1 | 10/2015 | Yokoyama et al. | |

OTHER PUBLICATIONS

Office Action dated Feb. 21, 2013; U.S. Appl. No. 12/492,931, filed Jun. 26, 2009; 13 pages.

Final Office Action dated Jun. 12, 2013; U.S. Appl. No. 12/492,931, filed Jun. 26, 2009; 18 pages.

Advisory Action dated Jul. 9, 2013; U.S. Appl. No. 12/492,931, filed Jun. 26, 2009; 3 pages.

Office Action dated Jan. 16, 2015; U.S. Appl. No. 12/492,931, filed Jun. 26, 2009; 9 pages.

Final Office Action dated Jul. 17, 2015; U.S. Appl. No. 12/492,931, filed Jun. 26, 2009; 15 pages.

Advisory Action dated Aug. 19, 2015; U.S. Appl. No. 12/492,931, filed Jun. 26, 2009; 4 pages.

Notice of Allowance dated Dec. 14, 2015; U.S. Appl. No. 12/492,931, filed Jun. 26, 2009; 14 pages.

* cited by examiner

METHODS FOR OPERATING AND CONSTRUCTING A BLOW THROUGH AIR HANDLER

CROSS-REFERENCE TO RELATED APPLICATIONS

This is a divisional application of the prior filed and co-pending U.S. patent application Ser. No. 12/492,931 filed on Jun. 26, 2009 by Stephen S. Hancock, and entitled "Blow Through Air Handler," the disclosure of which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Some considerations for improving aspects of air handling systems, such as heating, ventilating, and air conditioning (HVAC) systems for use in residential and commercial applications, is to produce air handling systems that are compact in size, energy efficient, economical to manufacture, and reasonable to install, operate and maintain. However, conventional air handling systems may be configured or otherwise contain components that do not realize the above-described development goals.

For example, a conventional HVAC air handling unit (AHU) contains a heat exchanger, blower, and a plurality of other structural and electrical components disposed within a rectangular cabinet having an air return opening at one end and an air supply opening at an opposing end. The components are typically positioned in the cabinet to promote the AHU's air handling capability. However, the volumetric size of a conventional AHU's cabinet is much larger than that encompassed by the components housed inside. Consequently, conventional AHUs may be undesirably large.

SUMMARY OF THE DISCLOSURE

In some embodiments, a method of operating an heating, ventilation, and/or air conditioning (HVAC) system is disclosed as comprising: providing an enclosure comprising a plurality of sides and having an air supply opening in one of the plurality of sides and an air return opening in another of the plurality of sides; disposing a blower within the enclosure; disposing a heat exchanger within the enclosure downstream of the blower and in the discharge airflow path of the blower, wherein the heat exchanger comprises a first section and a second section, and wherein each of the first section and the second section comprises a plurality of fins; disposing at least one electronically-powered resistive heating element substantially co-located with the heat exchanger and downstream of the heat exchanger in the discharge airflow path of the blower; providing an airflow through the enclosure via a discharge airflow path of the blower between the blower and the air supply opening in a downstream direction, the discharge airflow path having a longitudinal axis; and orienting the plurality of fins of the first section of the heat exchanger and the plurality of fins of the second section of the heat exchanger longitudinally parallel to the longitudinal axis of the discharge airflow path of the blower to stabilize the airflow exiting the heat exchanger prior to the airflow contacting the at least one electrically-powered resistive heating element.

In other embodiments, a method of operating a heating, ventilation, and/or air conditioning (HVAC) system is disclosed as comprising: providing an air handling unit comprising a first air opening and a second air opening; disposing a blower unit adjacent to the first air opening, wherein the blower unit comprises an air outlet and, and wherein the blower is configured to provide an airflow via a discharge airflow path having a downstream direction that extends from the air outlet of the blower to the second air opening, the discharge airflow path having a longitudinal axis; disposing a heat exchanger comprising a first section and a second section adjacent to and downstream of the air outlet of the blower unit in the discharge airflow path of the blower unit and adjacent to the second air opening, wherein each of the first section and the second section comprise a plurality of fins; disposing at least one electrically-powered resistive heating element substantially co-located with the heat exchanger and downstream of the heat exchanger in the discharge airflow path of the blower unit, adjacent to the second air opening, and at least partially between the first section of the heat exchanger and the second section of the heat exchanger; and orienting the plurality of fins of the first section of the heat exchanger and the plurality of fins of the second section of the heat exchanger longitudinally parallel to the longitudinal axis of the discharge airflow path to stabilize an airflow exiting the heat exchanger prior to the airflow contacting the at least one electrically-powered resistive heating element.

In yet other embodiments, a method of constructing an air handling unit is disclosed as comprising: forming an air handling unit having an air supply opening and an air return opening; mounting a blower in the air handling unit adjacent to the air return opening, the blower being configured to provide an airflow via a discharge airflow path having a downstream direction that extends from an air outlet of the blower to the air supply opening, and the discharge airflow path having a longitudinal axis; mounting a heat exchanger in the handling unit adjacent to the air supply opening and downstream of the blower in the discharge airflow path of the blower, the heat exchanger comprising a first section and a second section adjacent to and downstream of the air outlet of the blower, and each of the first section and the second section comprising a plurality of fins; mounting at least one heating element in the air handing enclosure adjacent to the air supply opening and downstream of the heat exchanger in the discharge airflow path of the blower; and configuring the plurality of fins of the first section of the heat exchanger and the plurality of fins of the second section of the heat exchanger to stabilize an airflow exiting the heat exchanger prior to the airflow contacting the at least one electrically-powered resistive heating element by orienting the plurality of fins of the first section of the heat exchanger and the plurality of fins of the second section of the heat exchanger longitudinally parallel to the longitudinal axis of the discharge airflow path.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Prior Art

Prior Art

DETAILED DESCRIPTION

Figure 1:
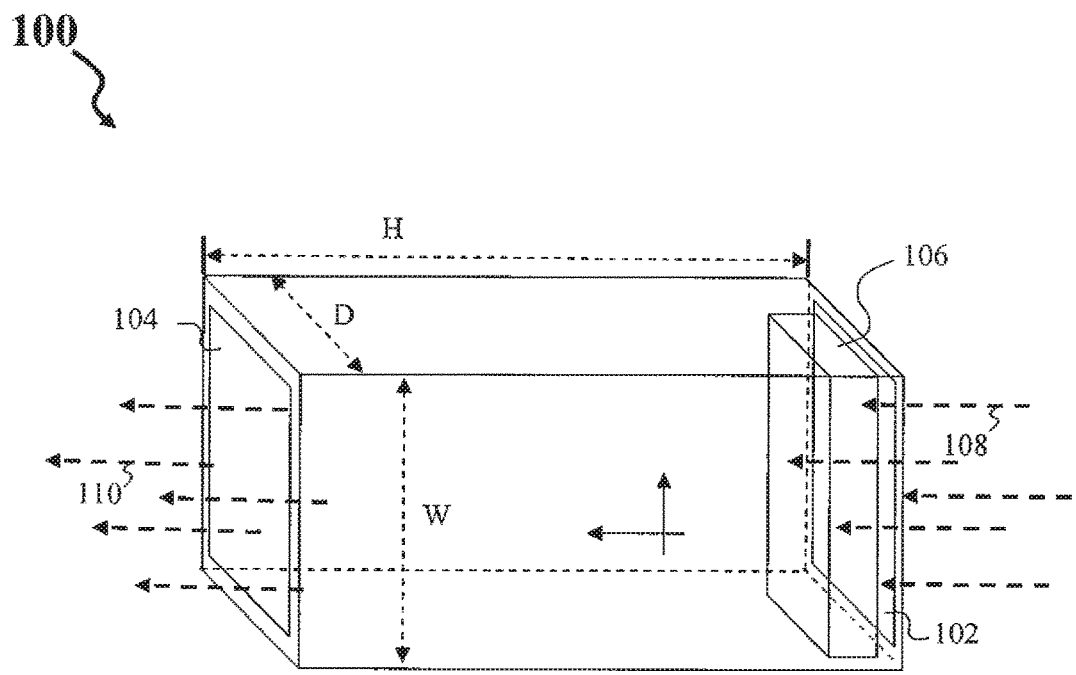
FIG. 1 depicts an oblique view of a conventional HVAC AHU cabinet.

Referring to Prior Art FIG. 1, a perspective view of a conventional HVAC AHU cabinet 100 is shown. Cabinet 100 includes an air return opening 102 disposed in one end and an air supply opening 104 disposed in the opposite end. The openings 102, 104 are rectangular and centrally aligned as shown. Cabinet 100 may also include a removable air filter 106 that filters out particulate contaminants and thus prevents them from entering cabinet 100.

In operation, ambient air is pulled into cabinet 100 through air return opening 102 and filter 106 (as illustrated by the dashed arrows 108). The incoming air may be heated by a plurality of heating elements (not depicted) or cooled and/or dehumidified by a plurality of heat exchangers (not depicted) disposed within cabinet 100. The heated or cooled air is forced out of cabinet 100 through air supply opening 104 (as illustrated by the dashed arrows 110).

Figure 2:
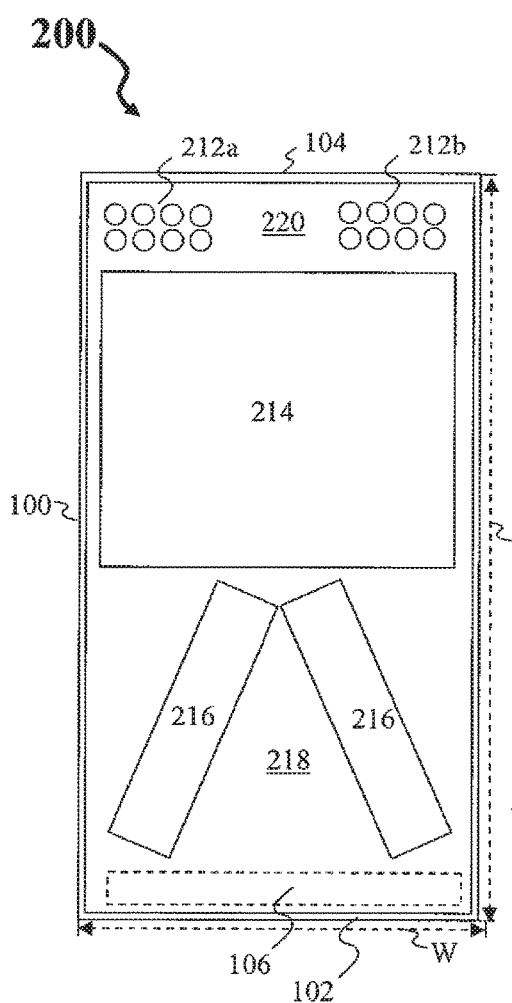
FIG. 2 depicts a side view of the conventional HVAC AHU shown in FIG. 1.

Referring now to FIG. 2, a side view of a conventional HVAC AHU 200 is shown. The AHU configuration depicted in FIG. 2 is widely used in residential applications but may also be used in commercial applications. AHU 200 includes a cabinet 100 (e.g., as depicted in FIG. 1), an air return opening 102, an air supply opening 104, and a removable air filter 106. AHU 200 also includes a plurality of electrically-powered resistive heating elements 212a and 212b to heat the air flowing through cabinet 100 and electrically powered motor-driven blower 214. The blower 214 moves air through cabinet 100 and a so-called "A-frame" heat exchanger 216 (each half of which is labeled 216) to cool and/or heat the air flowing through cabinet 100. Notably, as shown in Prior Art FIG. 2, in a conventional AHU, the heating elements are disposed in the supply section 220 of the cabinet, the heat exchanger is disposed in the return section 218 of the cabinet, and the blower is disposed in the region therebetween. The AHU 200 is an example of a "pull-through" type AHU because air is primarily pulled through the heat exchanger 216.

In operation, an increase in velocity of the airflow through an air inlet of the rotating blower 214 creates a negative air pressure in the return section 218 of cabinet 100 while an increase in velocity of the airflow through a discharge outlet of blower 214 creates a positive air pressure in the supply section 220. Consequently, ambient air is pulled into cabinet 100 through return opening 102 and filter 106, and passes through heat exchanger 216 and return section 218. The positive air pressure in supply section 220 forces the air through and around the plurality of heating elements 212a, 212b and out of cabinet 100 through supply opening 104.

There are numerous drawbacks of the conventional AHU 200 design. For example, the heating elements are located directly in the discharge airflow path of the blower 214, which is the most unstable and non-uniform airflow region in the conventional AHU 200. Also, the air return opening is located in an end rather than a side of the conventional AHU 200, which substantially limits options for the orientation of the incoming air. Furthermore, the heating elements 212a, 212b and heat exchanger 216 of the conventional AHU 200 are disposed in different sections of the cabinet 100, which also increases its size. Moreover, because the blower 214 is disposed between the heating elements 212a, 212b and heat exchanger 216 of the conventional AHU 200, the majority of the cabinet 100 operates under negative air pressure, which can pull in a substantial amount of unconditioned ambient air, degrade the performance of the AHU 200 and can pollute the conditioned airspace involved. Still further, since air is drawn through the heat exchanger 216 before encountering the components of the blower 214 and the heating elements 212a, 212b, the air may be humidified or otherwise may be conditioned in a manner that causes unnecessarily premature failure of the components of the blower 214 and/or the heating elements 212a, 212b. Accordingly, the above-mentioned goal of producing an air handling system that is compact, energy efficient, economical to manufacture, and reasonable to install, operate and maintain continues to be a motivating factor for further developments in this field.

The present disclosure provides an AHU that includes heating elements that are co-located with the heat exchanger in the discharge airflow path of the blower. For example, co-locating the heating elements and heat exchanger substantially decreases the AHU's size and thus increases the AHU's ease of installation, even for multiple installation configurations. Placement of the heat exchanger substantially directly downstream of the blower may not optimize a heat exchanger face velocity profile. However, such placement results in a substantially laminar or straightened and more stable airflow reaching the heating elements that are located directly downstream of the heat exchanger. The heat transfer, air flow, and efficiency of heat transfer (insofar as heat is transferred between the air and heating elements) is thereby improved as compared to the heat transfer characteristics of the heating elements of the conventional AHU 200. Furthermore, placement of the heating elements and heat exchanger downstream of the blower produces a positive air pressure in the majority of the cabinet, which decreases the amount of unconditioned and/or polluted air entering the AHU and increases the AHU's overall performance. For example, by providing the heat exchanger and related condensation plumbing in a space having positive air pressure reduces instances of the AHU drawing sewage gas from the associated plumbing, thereby increasing reliability of the components of the AHU which may otherwise have been exposed to such detrimental sewage gas.

Also, placement of the heating elements and heat exchanger downstream of the blower provides the option of positioning a return air opening on a side rather than only a bottom end of the AHU's cabinet. For example, installation of an AHU having a return air opening in a side of the cabinet may be preferable for certain space-limited applications, such as AHU installations in apartment or building equipment closets, or in retrofitting existing HVAC systems with newer HVAC systems where AHU size and installation flexibility are concerns. It will be appreciated that while embodiments of the present disclose may not address one or more of the above-described shortcomings of the prior art, some embodiments of the present disclosure may nonetheless provide for improvements over the prior art systems. Further, it will be appreciated that merely changing a conventional AHU's configuration from that of a pull-through configuration (where air is first drawn through a heat exchanger before interfacing with a blower) to a blow-through configuration (where a blower pushes air through a heat exchanger prior to the air interfacing with the heat exchanger) may, in some cases, result in a less energy efficient AHU. However, the present disclosure, in some embodiments disclosed herein, may minimize such loss in energy efficiency and/or may provide features that otherwise justify implementation of such features despite any loss in energy efficiency.

Figure 3:
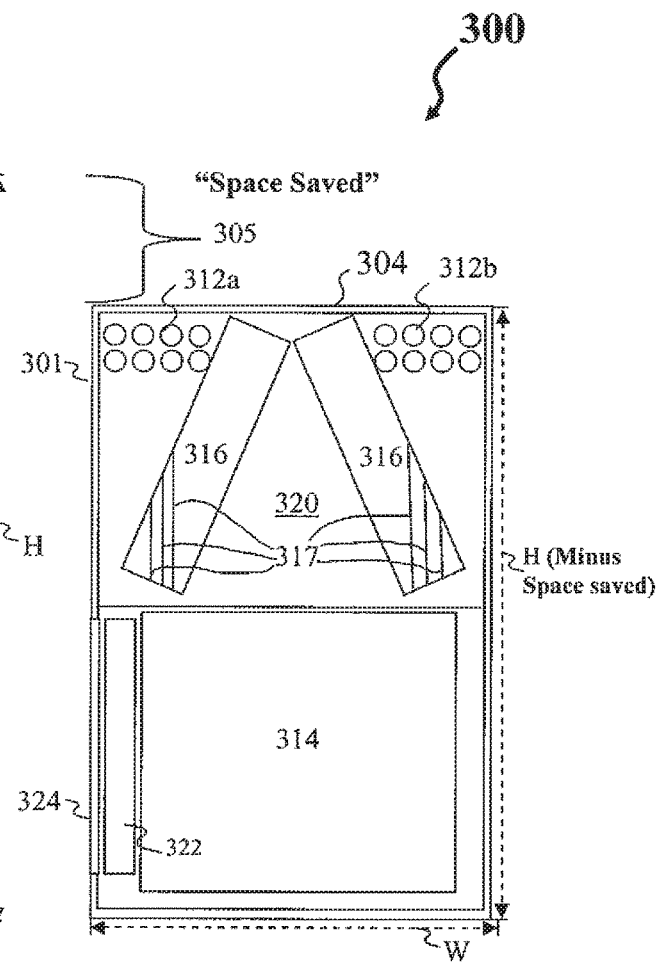
FIG. 3 is a side view of an HVAC AHU according to an embodiment.

Referring now to FIG. 3, a side view of an embodiment of a HVAC AHU 300 is shown. AHU 300 comprises a plurality of heating elements 312a and 312b, an electrically-powered motor-driven rotatable blower (or fan) 314, a heat exchanger 316 (the two halves of which are each labeled 316), and a removable air filter 322 located within a generally rectangular cabinet or other suitable enclosure 301. Cabinet 301 comprises an air supply opening 304 and a side air return opening 324 disposed in one side of cabinet 301 and approximately adjacent to air filter 322. A blower 314 is configured to take in air through a side opening of a housing of the blower 314 that is configured so that the side opening of the housing of the blower 314 is located approximately adjacent to air filter 322.

In the embodiment shown, the heating elements 312a, 312b are substantially co-located with the heat exchanger 316. In some embodiments, "co-located" may mean that the heating elements 312a, 312b and the heat exchanger 316 are located within the same section of cabinet 301. In other embodiments, "co-located" may mean that the heating elements 312a, 312b and the heat exchanger 316 are located downstream of blower 314. In the embodiment shown in FIG. 3, each heating element 312a, 312b is disposed adjacent to a respective side of heat exchanger 316 and near an upper end (as shown in the configuration of FIG. 3). In other embodiments, each heating element 312a, 312b may be disposed adjacent to a respective side of heat exchanger 316 but closer to a lower end than shown in FIG. 3.

Also, in the embodiment shown, each heating element 312a, 312b comprises a respective plurality of electrically-powered heating elements that heat the surrounding air. Note that although electrically-powered heating elements 312a, 312b are shown, in other embodiments, heating elements may be used that suitably heat the surrounding air but are not primarily electrically-powered (i.e., gas burners). Also note that although two heating elements 312a, 312b are shown, in other embodiments, more or fewer than two heating elements may be used. For example, the two heating elements 312a, 312b may comprise two sections or sub-units of a single heating element 312. In other embodiments, three or more heating elements or sub-units may be used.

In the embodiment shown, heat exchanger 316 is an "A-frame" type of heat exchanger and comprises a plurality of longitudinally finned tubes (sometimes referred to as "coils") containing a refrigerant, gas, liquid, material, or substance that cools and/or heats by transferring heat to or from the air surrounding the tubes, depending on the mode of use of the heat exchanger 316. Fins 317 are shown as being substantially vertically oriented thin plates that extend from the front of the heat exchanger 316 to the back of the heat exchanger 316. For clarity, only a few fins 317 are shown on each half of the heat exchanger 316. It will be appreciated that in alternative embodiments, fins may be oriented differently so that the fins remain vertically oriented but extend generally from left to right in a heat exchanger. The tubes and/or fins 317 may be constructed of copper, stainless steel, aluminum, or another suitable material that promotes heat transfer. In some embodiments, a heat exchanger may include a plurality of non-finned tubes containing a refrigerant, liquid, or other suitable cooling material. For example, such a heat exchanger may include a plurality of generally smooth and/or corrugated tubes instead of or in addition to fins such as fins 317.

For some embodiments using longitudinally finned tubes, the fin pitch (spacing between fins on a tube) may be about 0.05 inches to about 0.25 inches depending on the particular air handling application. For example, the heat exchanger tube fin pitch may be 0.1 inches for a residential application, 0.05 inches for an outdoor application, and 0.25 inches for a refrigeration type of HVAC system. As such, the heat exchanger 316 may include single or plural rows of tubes. Notably, the number, spacing, and fin pitch of the tubes included in alternative embodiments of a heat exchanger may be different, while the configuration of the fins nonetheless promotes less turbulent and a more stable air flow exiting the heat exchanger. For example, the orientation of the fins on the tubes may be selected to cause the turbulent airflow on the blower discharge air outlet side of heat exchanger 316 to become more laminar, more placid, increasingly straightened, directionally homogeneous, and/or more stable. In an embodiment, the orientation of the fins on the tubes may be selected such that the lower end(s) of the fins are oriented in the direction toward a discharge air outlet of the blower involved.

In some embodiments, AHU 300 may be used in residential applications such as for example, a heating and/or air conditioning system in an apartment, condominium, dwelling, or house. In other embodiments, AHU 300 may be used in commercial applications such as, for example, an HVAC system in a commercial, public, or industrial building or facility, or suitable other type of building or facility that distributes conditioned air. Also, in some embodiments, removable air filter 322 may be located outside of cabinet 301 (e.g., within an air duct connected to an air return opening of the cabinet or enclosure involved). In any event, it should be understood that the embodiment depicted in FIG. 3 is described herein for illustrative purposes and not intended to be limited to any particular HVAC, AHU, or air handling application, type of dwelling, building or facility, or other structural or functional environment.

Referring to Prior Art FIG. 2 and to FIG. 3 for comparison purposes, it will be appreciated that by co-locating the heating elements 312a, 312b with the heat exchanger 316 in the air supply section 320 of AHU 300, the height and overall volumetric space occupied by the AHU 300 are substantially reduced (e.g., amount of saved space 305 which demonstrates a shortening of AHU 300) than those of the conventional AHU 200. As such, AHU 300 is more compact than the conventional AHU. For example, by co-locating the heating elements 312a, 312b and heat exchanger 316 in the air supply section 320 of AHU 300, the height (H) of cabinet 301 may be approximately 15-20% less than the height (H) of cabinet 100. Also note that by co-locating the heating elements 312a, 312b and heat exchanger 316 in the air supply section 320 of AHU 300, the air return opening 324 may be disposed in either a side or the lower end of the cabinet 301, which allows for a variety of installation configurations.

Figure 4:
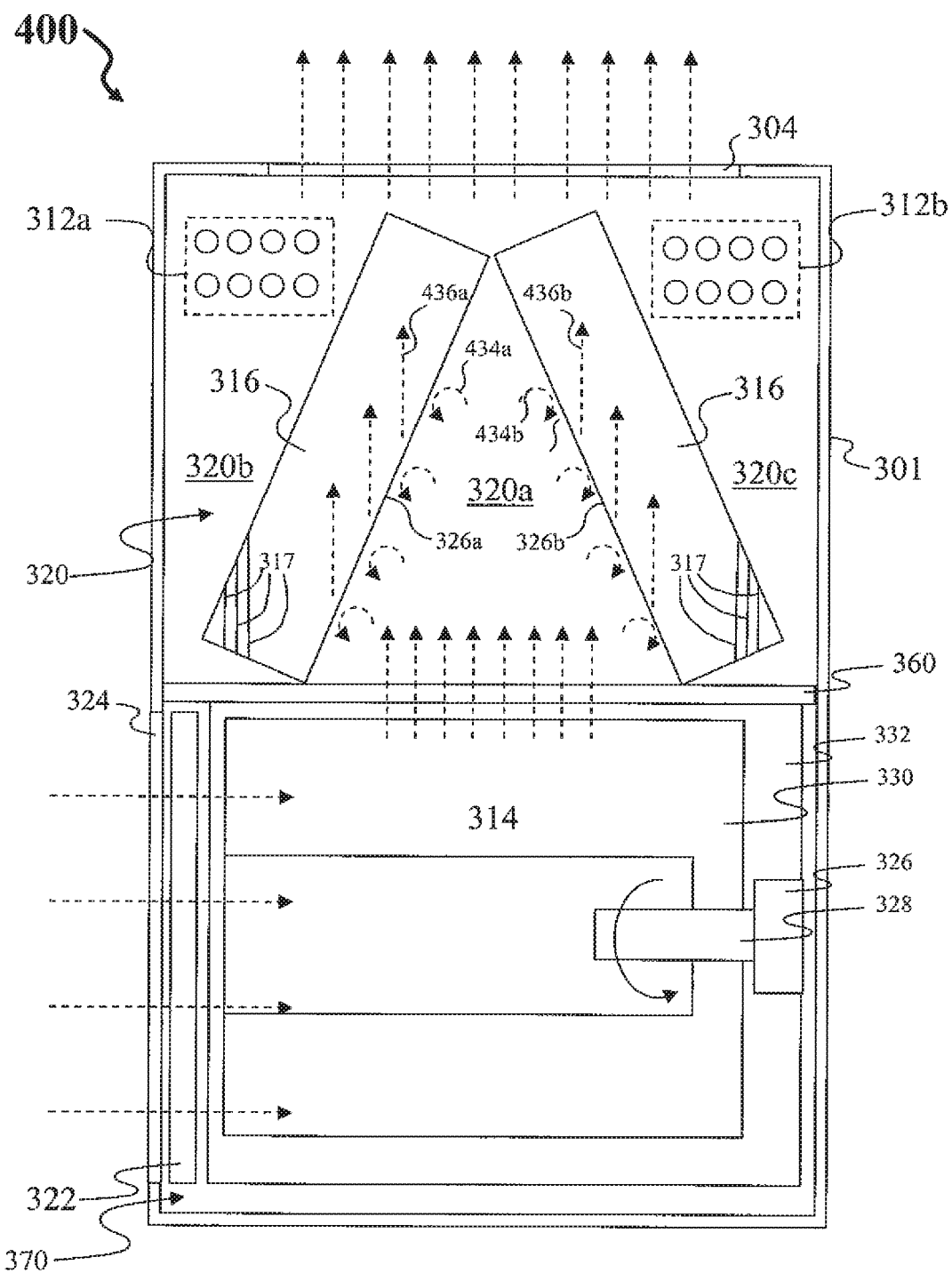
FIG. 4 depicts air flow in an operation of the AHU 300 shown of FIG. 3.

FIG. 4 depicts air flow in an operation of AHU 300. For illustrative purposes and ease of understanding, like parts in FIGS. 3 and 4 are marked with the same reference numerals.

An electrically-powered motor 326 rotates a driveshaft 328, which in turn rotates a blade assembly 330 of blower 314. The rotation of blade assembly 330 pulls ambient air into cabinet 301 through side air return opening 324 and (if included) through removable filter 322. The rotation of blade assembly 330 also pushes air out of the discharge air outlet of blower 314 and into the air supply section 320. More specifically, the blower 314 pushes air into the region or sub-section 320a of air supply section 320 as defined primarily by the opposing sides or surfaces 326a, 326b of heat exchanger 316. It will be appreciated that while blower 314 is shown as being driven by a direct drive electrically-powered motor 326, any other suitable motor and/or drive system may be used to rotate the blower 314. As denoted by the circular arrows 434a, 434b, the airflow in sub-section 320a of air supply section 320 and directly downstream from the discharge air outlet of blower 314 is relatively unstable and turbulent. Notably, the airflow entering air supply section 320 creates a substantial positive pressure (e.g., greater than 760 torr in some embodiments) in this section of AHU 300. The blower 314 also creates a negative pressure at or near the air return opening 324. As denoted by the arrows 436a and 436b, passage of the air from sub-section 320a through heat exchanger 316 produces a substantially laminar, straightened and more stable airflow in sub-sections 320b and 320c of air supply section 320. The more stable airflow promotes more efficient heat transfer between heating elements 312a, 312b and the surrounding air.

Figure 5:
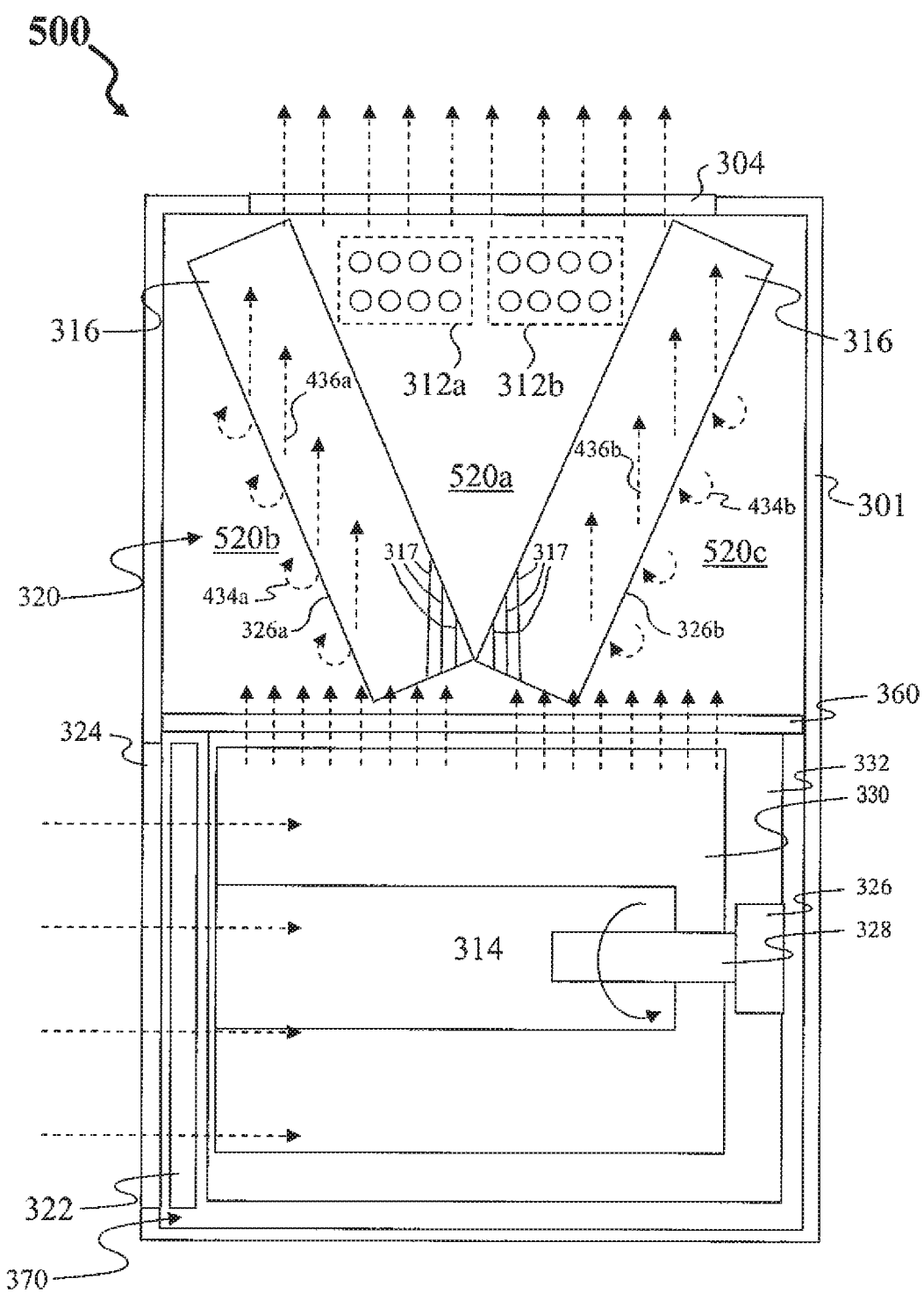
FIG. 5 is a side view of an HVAC AHU according to another embodiment and depicts air flow in an operation of the HVAC AHU of FIG. 5.

FIG. 5 depicts a side view of another embodiment of a HVAC AHU 500. Similar to AHU 400 shown in FIG. 4, AHU 500 comprises a plurality of heating elements 312a, 312b, an electrically-powered motor-driven blower (or fan) 314, a heat exchanger 316, and a removable air filter 322 located within the generally rectangular cabinet or other suitable enclosure 301. Also similar to AHU 400, the heating elements 312a, 312b are co-located with heat exchanger 316 downstream of the discharge air outlet of blower 314.

However, in this embodiment, the heat exchanger 316 comprises a "V-frame" or inverted "A-frame" type of heat exchanger that is structurally and functionally substantially similar to that of the "A-frame" heat exchanger 316 depicted in FIG. 3. Therefore, as denoted by the arrows 436a, 436b, passage of the air from sub-section(s) 520b, 520c through heat exchanger 316 produces a substantially laminar, straightened and more stable airflow in the sub-section 520a of air supply section 320, which promotes more efficient heat transfer from heating elements 312a, 312b to the surrounding air. It will be appreciated that while A-frame and V-frame heat exchangers are shown, this disclosure expressly contemplates the use of other configurations of heat exchangers. For example, an alternative embodiment of a heat exchanger may be configured as a single slab type heat exchanger that extends generally horizontally across air supply section 320.

Figure 6:
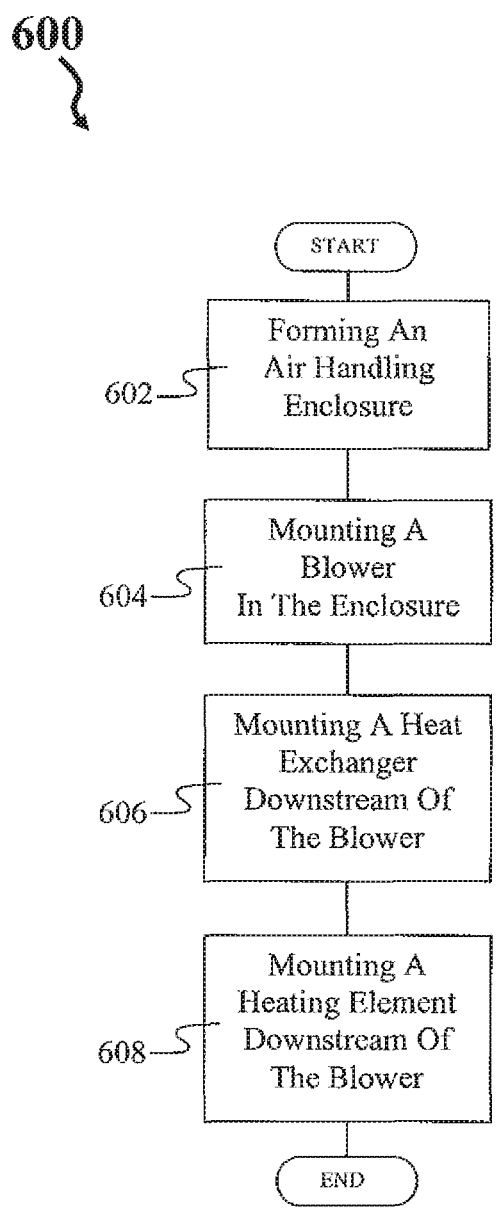
FIG. 6 is a flow chart of a method of constructing an HVAC AHU.

FIG. 6 is a flow chart that illustrates a method 600 of constructing an HVAC AHU in accordance with the principles disclosed herein. For example, method 600 may be used to construct one or more of the AHUs 300, 400 or 500 shown in FIGS. 3, 4 and 5, respectively. At block 602, a cabinet or other suitable air handling enclosure is formed. For example, the enclosure may be structurally and functionally similar to that of cabinet 301, with an air return opening 324 disposed in a side or an end of the cabinet, and an air supply opening 304 disposed in an opposing end. Preferably, the air return opening 324 and/or air supply opening 304 are rectangular shaped, but in some embodiments, one or more of these openings may be circular shaped, oval shaped, or another suitable air opening shape. In some embodiments, the cabinet or enclosure may be formed with two sections (e.g., an air return section and an air supply section). In other embodiments, the cabinet or enclosure may be formed with more or fewer than two sections. For example, the cabinet 301 may be formed as an integral unit without disparate sections, or with three or more sections (e.g., air return section, blower section, air supply section).

At block 604, a blower (or fan) assembly is mounted within the cabinet or enclosure. For example, in some embodiments, the blower 314 may be mounted within the air return section 370 of cabinet 301 and adjacent to the air return opening 324. In the embodiments depicted in FIGS. 3-5, the air intake portion of the blower 314 is disposed near a side air return opening of the cabinet 301. In other embodiments, the air intake portion of the blower 314 may be disposed near an air return opening located in an end of cabinet 301 (e.g., at the bottom of FIG. 4). Notably, the orientation of the blower 314 with respect to that of the heat exchanger 316 may be different than the orientations shown. For example, in some embodiments, the heat exchanger 316 may be rotated longitudinally by 90 degrees so FIG. 4 or 5 (without changing the orientation of blower 314) depict an end view instead of a side view of heat exchanger 316. In other embodiments, the blower 314 may be rotated longitudinally by 90 degrees without changing the orientation of the heat exchanger 316.

At block 606, a heat exchanger is mounted downstream of the blower and within the cabinet or enclosure involved. The heat exchanger includes a plurality of tubes, shells, or coils having longitudinally-oriented fins for straightening air flow, as described above. In some embodiments, the heat exchanger may be an "A-frame" heat exchanger, and in other embodiments, the heat exchanger may be a "V-frame" heat exchanger. In yet other embodiments, a heat exchanger that is neither an "A-frame" nor "V-frame" type of heat exchanger may be used. Further, a heat exchanger without fins may be used (e.g., using one or more smooth or corrugated tubes, shells, or coils).

At block 608, the heating elements are also mounted downstream of the blower and within the cabinet or enclosure involved. For example, as depicted by the embodiment shown in FIG. 4, the heating elements 312a and 312b are mounted adjacent to the respective downstream sides of the heat exchanger 316 (e.g., external to the "A") and nearby air supply opening 304. As another example, as depicted by the embodiment shown in FIG. 5, the heating elements 312a and 312b are also mounted adjacent to the respective downstream sides of the heat exchanger 316 (e.g., internal to the "V") and nearby air supply opening 304.

Figure 7:
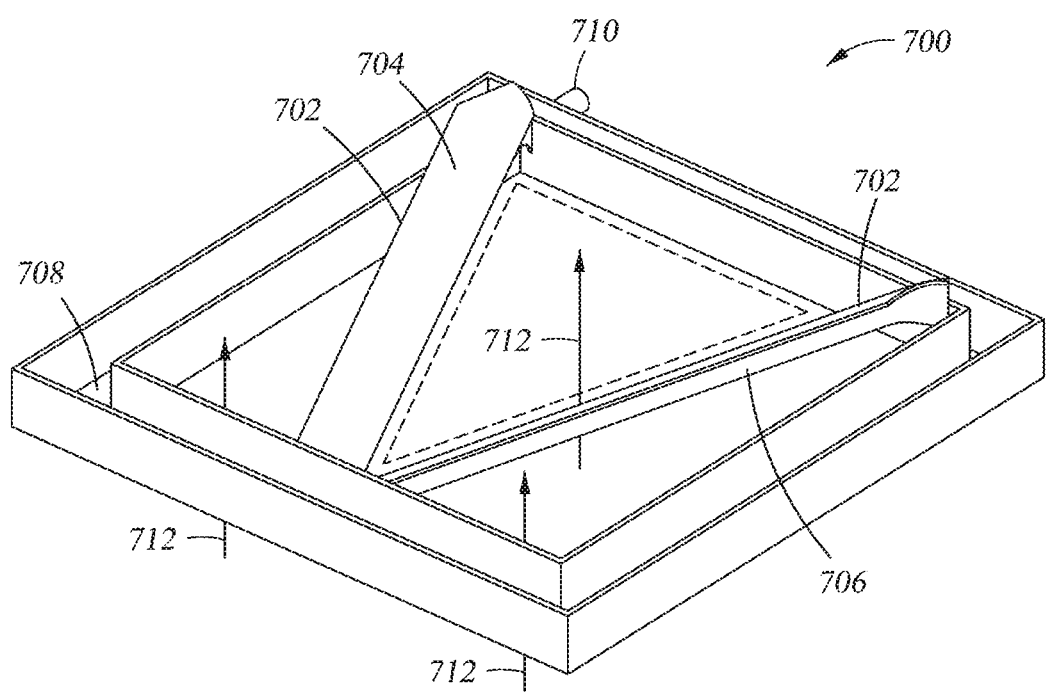
FIG. 7 is an oblique view of an embodiment of a diffuser.

Referring now to FIG. 7, a diffuser 700 for use in a blow-through type AHU is disclosed. As previously mentioned, locating a heat exchanger directly downstream of blower output airflow may not optimize a heat exchanger face velocity profile. In some cases, the resultant velocity profile may actually vary more across the face of the heat exchanger as compared to a heat exchanger face velocity profile in a conventional pull-through AHU configuration. Such increased variation in face velocities generally results in a reduction in heat transfer efficiency for the heat exchanger. Accordingly, the diffuser 700 may be incorporated into an embodiment of a blow-through AHU configuration of the types disclosed herein. Specifically, the diffuser 700 comprises two curved blades 702, a first curved blade 702 being oriented with respect to a second curved blade 702 to form a V-shaped structure. In this embodiment, each blade 702 comprises a convex surface 704 and a corresponding concave surface 706. Further, the diffuser 700 is carried by a drain pan 708 having a drain tube 710. In operation, the diffuser 700 is located between a blower and a heat exchanger so that airflow 712 passes the diffuser 700 as the airflow travels from the blower to the heat exchanger. The blades 702 are oriented so that the convex surfaces 704 face each other and so that airflow contacts the concave surfaces 706, resulting in an improved heat exchanger face velocity profile. The improved heat exchanger face velocity profile further improves heat exchange between the airflow and the heat exchanger.

Still further, as mentioned above, while some characteristics of the blow-through configurations of AHUs disclosed herein may not improve overall AHU heat exchange efficiency, other considerations may justify such blow-through configurations. One such justification is the expected increase in reliability of the blow-through configuration AHUs disclosed herein as compared to other conventional pull-through configuration AHUs. Specifically, the blow-through configurations AHUs disclosed herein may provide an overall cost reduction in anticipated repairs and/or service. Similarly, the motors associated with the blowers and the heat exchangers may provide longer service lives. One or more of the above improvements in performance may be attributable to the motors being in a return air environment that is relatively cool and dry as opposed to being downstream of a heat exchanger. Similarly, one or more of the above improvements in performance may be attributable to the heat exchanger being operated in a positive air pressure environment as opposed to in a negative air pressure environment. Accordingly, the overall reliability of a blow-through AHU of the type disclosed herein may be increased so that over the course of one year, a blow-through AHU may have only about one-third the number of failures of a conventional pull-through AHU. Similarly, the overall reliability of a blow-through AHU of the type disclosed herein may be increased so that over the course of ten years, a blow-through AHU may have only about 40-50% the number of failures of a conventional pull-through AHU.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. A method of operating a heating, ventilation, and/or air conditioning (HVAC) system, comprising:
    providing an enclosure comprising a plurality of sides and having an air supply opening in one of the plurality of sides and an air return opening in another of the plurality of sides;
    disposing a blower within the enclosure;
    disposing a heat exchanger within the enclosure downstream of the blower and in the discharge airflow path of the blower, wherein the heat exchanger comprises a first section and a second section, and wherein each of the first section and the second section comprises a plurality of fins;
    disposing at least one electrically-powered resistive heating element substantially co-located with the heat exchanger and downstream of the heat exchanger in the discharge airflow path of the blower;
    providing an airflow through the enclosure via a discharge airflow path of the blower between the blower and the air supply opening in a downstream direction, the discharge airflow path having a longitudinal axis; and
    orienting the plurality of fins of the first section of the heat exchanger and the plurality of fins of the second section of the heat exchanger longitudinally parallel to the longitudinal axis of the discharge airflow path of the blower to stabilize the airflow exiting the heat exchanger prior to the airflow contacting the at least one electrically-powered resistive heating element.

2. The method of claim 1, wherein the enclosure is a blow through air handler.

3. The method of claim 1, wherein the air return opening is disposed in a side of the cabinet.

4. The method of claim 1, wherein the air return opening is disposed in a lower end of the enclosure.

5. The method of claim 1, wherein the heat exchanger comprises a "V-frame" heat exchanger.

6. The method of claim 5, wherein the at least one electrically-powered resistive heating element is at least partially disposed between the first section of the heat exchanger and the second section of the heat exchanger.

7. The method of claim 6, further comprising:
    disposing the heat exchanger and the at least one electrically-powered resistive heating element adjacent to the air supply opening.

8. The method of claim 7, further comprising:
    disposing the blower adjacent to the air return opening.

9. The method of claim 1, wherein the heat exchanger comprises an "A-frame" heat exchanger.

10. The method of claim 1, wherein the at least one electrically-powered resistive heating element is at least partially disposed between at least one of the first section of the heat exchanger and the second section of the heat exchanger and at least one of the plurality of sides of the enclosure.

11. A method of operating a heating, ventilation, and/or air conditioning (HVAC) system, comprising:
   providing an air handling unit comprising a first air opening and a second air opening;
   disposing a blower unit adjacent to the first air opening, wherein the blower unit comprises an air outlet and, wherein the blower unit is configured to provide an airflow via a discharge airflow path having a downstream direction that extends from the air outlet of the blower unit to the second air opening, the discharge airflow path having a longitudinal axis;
   disposing a heat exchanger comprising a first section and a second section adjacent to and downstream of the air outlet of the blower unit in the discharge airflow path of the blower unit and adjacent to the second air opening, wherein each of the first section and the second section comprise a plurality of fins;
   disposing at least one electrically-powered resistive heating element substantially co-located with the heat exchanger and downstream of the heat exchanger in the discharge airflow path of the blower unit, adjacent to the second air opening, and at least partially between the first section of the heat exchanger and the second section of the heat exchanger; and
   orienting the plurality of fins of the first section of the heat exchanger and the plurality of fins of the second section of the heat exchanger longitudinally parallel to the longitudinal axis of the discharge airflow path to stabilize an airflow exiting the heat exchanger prior to the airflow contacting the at least one electrically-powered resistive heating element.

12. The method of claim 11, wherein the first air opening is disposed in a side of the air handling unit.

13. The method of claim 11, wherein the first air opening is disposed in a lower end of the air handling unit.

14. The method of claim 11, wherein the heat exchanger comprises a "V-frame" heat exchanger.

15. A method of constructing an air handling unit, comprising:
   forming an air handling unit having an air supply opening and an air return opening;
   mounting a blower in the air handling unit adjacent to the air return opening, the blower being configured to provide an airflow via a discharge airflow path having a downstream direction that extends from an air outlet of the blower to the air supply opening, and the discharge airflow path having a longitudinal axis;
   mounting a heat exchanger in the air handling unit adjacent to the air supply opening and downstream of the blower in the discharge airflow path of the blower, the heat exchanger comprising a first section and a second section adjacent to and downstream of the air outlet of the blower, and each of the first section and the second section comprising a plurality of fins;
   mounting at least one heating element in the air handing enclosure adjacent to the air supply opening and downstream of the heat exchanger in the discharge airflow path of the blower; and
   configuring the plurality of fins of the first section of the heat exchanger and the plurality of fins of the second section of the heat exchanger to stabilize an airflow exiting the heat exchanger prior to the airflow contacting the at least one electrically-powered resistive heating element by orienting the plurality of fins of the first section of the heat exchanger and the plurality of fins of the second section of the heat exchanger longitudinally parallel to the longitudinal axis of the discharge airflow path.

16. The method of claim 15, wherein the air handling unit comprises an air supply section and an air return section.

17. The method of claim 16, wherein mounting the heat exchanger and the at least one heating element comprises co-locating the heat exchanger and the at least one heating element in the air supply section of the air handling unit.

18. The method of claim 17, wherein the blower is located in the air return section of the air handling unit.

19. The method of claim 15, wherein the air return opening is disposed in a side of the air handling unit.

20. The method of claim 15, wherein the air return opening is disposed in a lower end of the air handling unit.

* * * * *